(12) United States Patent
Noel

(10) Patent No.: US 8,650,416 B2
(45) Date of Patent: Feb. 11, 2014

(54) COMMUNICATIONS NETWORK WITH NODES HAVING POWER CONTROL CAPABILITY

(75) Inventor: Denis Noel, Grez-Doiceau (BE)

(73) Assignee: NXP B.V., Eindhoven (NL)

( * ) Notice: Subject to any disclaimer, the term of this patent is extended or adjusted under 35 U.S.C. 154(b) by 188 days.

(21) Appl. No.: 13/108,158

(22) Filed: May 16, 2011

(65) Prior Publication Data

US 2012/0054507 A1 Mar. 1, 2012

(30) Foreign Application Priority Data

May 17, 2010 (EP) .................................... 10250939

(51) Int. Cl.
G06F 1/26 (2006.01)
G06F 1/32 (2006.01)

(52) U.S. Cl.
USPC ............................ 713/300; 713/320; 713/324

(58) Field of Classification Search
USPC .......................................... 713/300, 320, 324
See application file for complete search history.

(56) References Cited

U.S. PATENT DOCUMENTS

| | | | |
|---|---|---|---|
| 6,311,276 B1 | 10/2001 | Connery et al. | |
| 6,470,393 B1 | 10/2002 | Heinrich et al. | |
| 6,556,580 B1 | 4/2003 | Wang et al. | |
| 7,779,195 B2 * | 8/2010 | Motomura et al. | 710/313 |
| 2005/0086460 A1 | 4/2005 | Huang | |
| 2006/0160559 A1 * | 7/2006 | Bahl et al. | 455/522 |
| 2007/0005824 A1 * | 1/2007 | Howard | 710/18 |
| 2007/0124608 A1 * | 5/2007 | Knowlson et al. | 713/300 |
| 2007/0240002 A1 * | 10/2007 | Motoyama | 713/320 |
| 2009/0080442 A1 * | 3/2009 | Narayan et al. | 370/400 |
| 2009/0259861 A1 * | 10/2009 | Tune | 713/320 |
| 2009/0274070 A1 * | 11/2009 | Mukherjee et al. | 370/257 |
| 2010/0049881 A1 * | 2/2010 | Manor et al. | 710/18 |
| 2011/0029659 A1 * | 2/2011 | Shah | 709/224 |
| 2011/0078467 A1 * | 3/2011 | Hildebrand | 713/310 |
| 2011/0107116 A1 * | 5/2011 | Diab et al. | 713/300 |
| 2011/0154070 A1 * | 6/2011 | Welter | 713/310 |
| 2012/0151239 A1 * | 6/2012 | Wang | 713/324 |

OTHER PUBLICATIONS

Extended European Search Report for European Patent Application No. 10250939.5 (Oct. 20, 2010).

* cited by examiner

*Primary Examiner* — Vincent Tran

(57) ABSTRACT

A communications network comprising a plurality of nodes, each comprising a network device and a network interface, at least one of the nodes having a first local power manager associated therewith and adapted to control power to the network device.

17 Claims, 4 Drawing Sheets

COMMUNICATIONS NETWORK WITH NODES HAVING POWER CONTROL CAPABILITY

This application claims the priority under 35 U.S.C. §119 of European patent application no. 10250939.5, filed on May 17, 2010, the contents of which are incorporated by reference herein.

FIELD OF THE INVENTION

This invention relates to a network, and particularly, but not exclusively, to a communications network suitable for use in an automobile.

BACKGROUND OF THE INVENTION

As is well known in the art, Ethernet is a widely used network technology and has proved its reliability and quality in extreme conditions. Ethernet's wide proliferation, high bandwidth, and simple protocol make it an excellent connectivity solution.

A problem with using Ethernet in an automobile however is the limited number of options available to manage the network power consumption. This results in the system requiring a high power consumption in some cases that is not feasible in automobiles. The standard and common techniques that could be used in the context of power management of Ethernet devices include Power over Ethernet (PoE) and Wake-up on LAN (WoL).

As is known in the art, a communications network comprises a plurality of nodes. In an Ethernet communications network, each node comprises one or more hosts (or network devices), on which an application runs, and an Ethernet transceiver. The Ethernet transceiver forms in an interface between the one or more network devices (or hosts), and the network itself, and is therefore known as a network interface. Within a node, it is also necessary to have an internal node interface to allow access to the network interface by the one or more network devices within a particular node. An example of an internal node interface is a processor bus.

Nodes forming a switched Ethernet communications network may be categorised as either end nodes, or as switches. An end node comprises one or more network devices and a network interface. A switch interconnects end nodes and comprises one or more switch ports equipped with a network interface.

The Wake-up On LAN (WoL) technique makes it possible to wake-up a host. However, because the remote wake-up is based on the detection of a data pattern in the payload of the packet of the Ethernet PHY (physical layer) this layer of the network must be kept alive at all times to be able to decode bits. This activity represents a few hundreds of miliwatts. This is orders of magnitude too high for automotive markets.

Power over Ethernet (PoE) delivers power over standard Ethernet cables. PoE can be used to supply power to nodes through the Ethernet cables. When used in a vehicle, the voltage level must be adapted to match the automotive environment requirements. This means that the network nodes can be completely shut down, for example when the car is locked. However the technique does not allow a node or a group of nodes to wake-up under their own initiative as in any centralized power management system.

As is known in the art, switched Ethernet network topology is based on a star or multi-star format. FIG. 1 is a schematic illustration of a known switched Ethernet network topology. The network illustrated in FIG. 1 is installed in an automobile.

In order to reduce power consumption of the network infrastructure, it is desirable to be able to shut down any unused or infrequently used node in a network.

A network device such as an end node or a switch may be powered off when the particular device does not participate in the network. When a device is powered off, no information can be exchanged with that device. This means that not only can the network interface be shut down, but that the hardware of the application may also be shut down.

In the network shown in FIG. 1 only the rear seat units (RSU) are active and, it is possible to completely power off devices that are connected to the unused ports.

It is, however, necessary for at least one node in the network to remain active and to be connected to a central power management unit of the vehicle in order to be able to power off the entire system, for example, when the doors of the car are locked. In the system illustrated in FIG. 1 it is the seven port switch that is the node that remains at least partially active and is connected to the central power management unit.

Generally, a network interface will be shut down with/by the host to which it interfaces. In such a case the host is no longer reachable. Most systems work in this way because it is the host that requests access to the network rather than a network requesting access to the host.

SUMMARY OF THE INVENTION

According to a first aspect of the present invention there is provided a communications network comprising a plurality of nodes, each comprising a network device and a network interface, at least one of the nodes having a first local power manager associated therewith and adapted to control power to the network device.

The first local power manager may be located within the network interface. Alternatively, and particularly in embodiments of the invention where the node comprises a single network device only, the first power manager may be located in the network device. It is to be understood however that the first power manager could be located at any convenient location.

By means of the present invention, it is possible to individually power down a network device forming part of a communications network, without necessarily powering down any other of the network devices.

The first local power manager may be in the form of hardware, software or a mixture of both hardware and software.

The local power manager may be adapted to transmit a first power mode signal from the network interface to a network device or vice versa.

By means of the present invention it is thus possible for either a network device or the network interface to initiate power up or power down.

The first local power manager may be adapted to control power to the at least one network device in response to a state of the network device.

The first local power manager associated with a network device may be adapted to, for example sense the level of traffic to and/or from the network device, and on the basis of the level of the traffic sensed, determine whether that network device should be switched on or off for a certain period of time, or powered down or up.

The first local power manager may comprise a pull up resistor located in the network interface, which pull up resistor is connectable to the network device.

The pull up resistor forming part of the first local power manager may further comprise a first power switch adapted to ground the first power mode signal at the request of one of the network interface or the network device, and a second power switch adapted to ground the first power mode signal at the request of the other of the network interface and the network device.

Alternatively, the first local power manager may comprise a pull down resistor, a first power switch adapted to connect the power mode signal to $V_{DD}$ at the request of one of the network interface and the network device, and a second power switch for connecting the first power mode signal to $V_{DD}$ at the request of the other of the network interface and the network device.

This means that it is possible for either the network interface or the network device to ground the first power mode signal, thus enabling either the network device or the interface to initiate powering up or powering down of the device.

One or more of the nodes may comprise a network switch, and a second local power manager associated therewith may be adapted to control power to and from the network switch.

The second local power manager may be adapted to transmit a second power mode signal from the network switch with which it is associated, to an end node, or vice versa.

The second local power manager associated with the network switch may be adapted, for example, to sense the level of traffic to and/or from an end node. On the basis of the level of traffic sensed, the second local power manager may determine whether one or more of the network devices forming part of the end node should be switched on or off for a certain period of time, or powered up or down.

This means that the second power mode signal may also be used to initiate powering up or powering down of a particular network device based on the state of that network device.

The second local power manager may comprise hardware, software or a mixture of both hardware and software.

The second local power manager may be located in the network switch at a particular port, or at a port transceiver. Alternatively, the second local power manager may be positioned in any other appropriate position.

In an Ethernet communications network the second power mode signal may be transmitted via the power supply for the network device in a network using Power over Ethernet (PoE). Alternatively, the signal can be different to the Power over Ethernet signal and then can be superposed to the Ethernet data lines by means of common mode voltage for example, or may be put on separate wires.

The second local power manager may comprise a pull up resistor located in the network switch, which pull up resistor is connectable to an end node.

The pull up resistor forming part of the second local power manager may further comprise a first power switch adapted to ground the second power mode signal at the request of one of the network switch and the end node to which the network switch is connected, and a second power switch adapted to ground the second power mode signal at the request of the other of the network switch and the end node connected thereto.

Alternatively, the second power manager may comprise a pull down resistor, a first power switch adapted to connect the second power mode signal to VDD at the request of one of the network switch and the end node to which the network switch is connected and a second power switch adapted to connect the second power mode signal to VDD at the request of the other of the network switch and the end node.

This means that powering down of one or more of the network devices may be instigated by the network switch in response, for example to traffic received from a particular end node. In a situation where power down is instigated by a network switch, power down will only occur in the event that a particular network device agrees to the power down. In the event that power down is agreed to, a particular end node will receive the second power mode signal from the network switch. This will then result in the transceiver associated with that end node requesting power down of a particular network device. That particular network device may agree to power down based on the status of that device.

It is to be understood that the second power manager may also be associated with a network hub. A hub in a network such as an Ethernet network systematically broadcasts received packets through all other ports in the hub, whereas a network switch transfers a packet to a single port.

It is to be understood therefore that any reference to a network switch within the specification is also applicable to a network hub.

In other words, one or more of the nodes of the communications network according to the invention may comprise a network hub, and a second local power manager associated therewith adapted to control power to and from the network hub.

The features that have been defined hereinabove with reference to a second power manager associated with a network switch are also applicable to a second power manager associated with a network hub.

The communications network may further comprise a central power management system. The central power management system may comprise a third local power manager adapted to control power to the network.

When the network is installed within a vehicle such as a car, the central power management system may be the central power management system of the car.

The central power management system may be adapted to transmit a third power mode signal to one or more nodes. The third power mode signal may be transmitted in response to external factors. For example, if the communications network is installed in an automobile, the central power management system may be adapted to transmit a third power mode signal causing one or more network devices to power down when, for example, all the doors of the automobile are locked.

This may then cause the network devices to instigate powering down by transmitting a first power mode signal to their peer units (the network interfaces). This in turn will cause the end nodes to instigate powering down by transmitting a second power mode signal to their peer units (the network switches).

The central power management system may thus work in conjunction with the first and second local power managers.

The communications network according to the present invention may comprise any suitable communications network, but in some embodiments of the invention the network comprises an Ethernet network.

This has the advantage that such a network is likely to be reliable, and can be easily interfaced with Ethernet networks that may be used for automobile diagnostic applications, for example.

The communications network may comprise a star or multi-star format. This has the advantage that network devices that are likely to be required to be used at the same time can be grouped together so that they are linked together via a single switch.

According to a second aspect of the present invention there is provided a method for controlling power to a network device forming part of a node of a communications network, the node further comprising a network interface, the method comprising the step of:

transmitting a first power mode signal from the network interface to the network device or vice versa in dependence on the state of the network device.

The first power mode signal may be transmitted to the network device by a first local power manager associated with the network device.

The method may comprise the further step of sensing traffic to or from the network device, and modulating the first power mode signal in response to the level of traffic sensed.

One or more nodes of the communications network may comprise a network switch, and the method may comprise the further step of transmitting a second power mode signal from the network switch to an end node vice versa, which second power mode signal is adapted to control power to the network.

The method may comprise a further step of sensing traffic to or from the end node, and modulating the second power mode signal in response to the level of traffic sensed.

The method may comprise the further step of transmitting a third power mode signal to one or more of the nodes, which third power mode signal is adapted to control power to the network.

The method according to the second aspect of the present invention may be used in conjunction with a communications network according to embodiments of the first aspect of the invention, and features that have been described with reference to the first aspect of the invention may also be applied when carrying out the method according to the second aspect of the invention.

BRIEF DESCRIPTION OF THE DRAWINGS

The invention will now be further described by way of example only with reference the accompanying drawings in which.

DETAILED DESCRIPTION OF EMBODIMENTS

Figure 1:
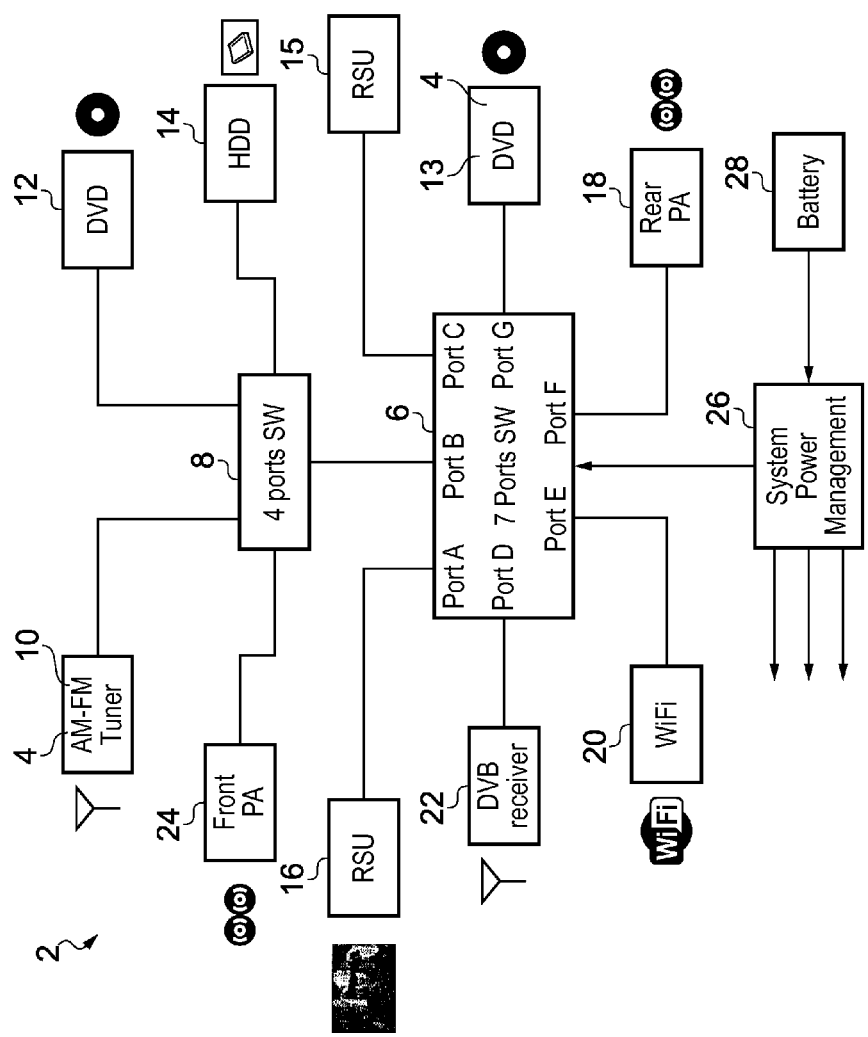
FIG. 1 is a schematic representation of a known communications network comprising a system power management unit.

FIG. 1 illustrates schematically a known network 2 for communicating data to and from network devices 4. The network 2 is in the form of a switched Ethernet network and thus has a basic star, or multi-star configuration and is installed in an automobile.

In the network 2 the network comprises two network switches 6, 8. Switch 6 is a seven port switch and switch 8 is a four port switch. However, the switches could have any number of ports appropriate for the application. In addition, the network could have more than two switches.

The network devices 4 illustrated in FIG. 1 comprise a tuner 10, DVDs 12, 13, a hard disc drive (HDD) 14, two rear seats units 15, 16, a rear power amplifier 18, a WiFi connection 20, a DVB receiver 22 and a front power amplifier 24. It is to be understood however that the network could have a different number of network devices, and different network devices.

The network devices 10, 12, 14 and 24 are operably connected to the four port switch 8, and the network devices 13, 15, 16, 18, 20 and 22 are operably connected to the seven port switch 6. The two switches 6, 8 are also operatively connected to one another.

Each of the switches, in operation, reads the destination address of each packet arriving at one of its ports. This enables the switches 6, 8 to build a table mapping the MAC address of each of the network devices 4 with the particular switch port that the station is directly or indirectly connected to.

Based on this table built during the learning phase of the switch 6, 8, the switch can forward each incoming packet to the correct port and to no other ports. The switch does not therefore have to broadcast a particular packet to all ports as is the case in an Ethernet hub configuration. However, a switch in the configuration shown in FIG. 1 will behave as a hub and therefore broadcast packets under the following conditions:

the switch is in its learning phase;
the packet is of the broadcast type;
the destination MAC address of the packet is not found within the switch table.

In order to preserve power consumption, any one of the network devices 4 or switches 6, 8 can be powered off when that device does not have to participate in the network. Once a network device has been powered off, it is not possible for any data to be exchanged with that device.

Under such circumstances, it is possible not only for the network interface associated with a device to be shut down, but also for the hardware of the application that is connected to the network interface to be shut down. For example, if the tuner 10 is to be powered off, it is possible for the interface between the tuner 10 and the network 2 to be powered off, and also for the hardware in the tuner 10 to be powered off.

The network 2 is connected to a central power management system 26, which system is adapted to manage the power consumption of the vehicle as a whole. This is in order that the network 2 may be completely powered off when, for example, the doors of the vehicle are locked indicating that the car is not in use.

The central power management unit 26 is operatively connected to, in this case switch 6, and powered by battery 28 which also powers the vehicle in which the network is installed.

In the situation illustrated in FIG. 1, only the rear seat units 15, 16 are active and are communicating with the DVD drive 12.

This means that it is necessary only for data to be exchanged between ports A, C and G of the seven port switch 6. This further means that all four ports on the four ports switch 8 may be completely powered off.

The ports of the four port switch 8 are powered off by the central power management system 26.

In known network systems of the type illustrated in FIG. 1 it is necessary to have at least one of the nodes forming the network connected to the central power management system 26. In the network 2, it is switch 6 which is the node connected to the central power management 32. This in turn is powered by the vehicle battery 28.

In the communication network 2, it is not possible to dynamically power down individual nodes forming part of the network.

Figure 2:
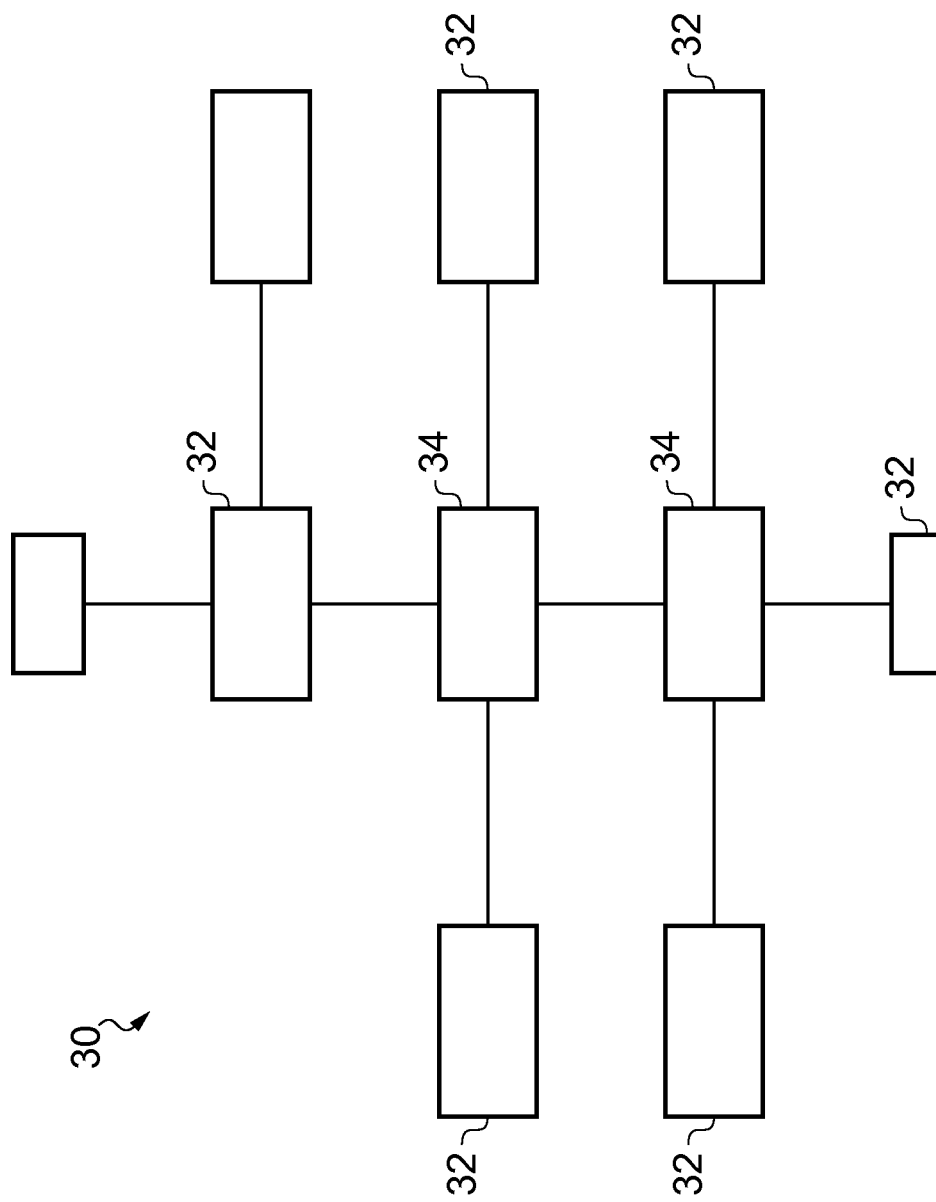
FIG. 2 is a schematic representation of a communications network according to an embodiment of the present invention.
Figure 3:
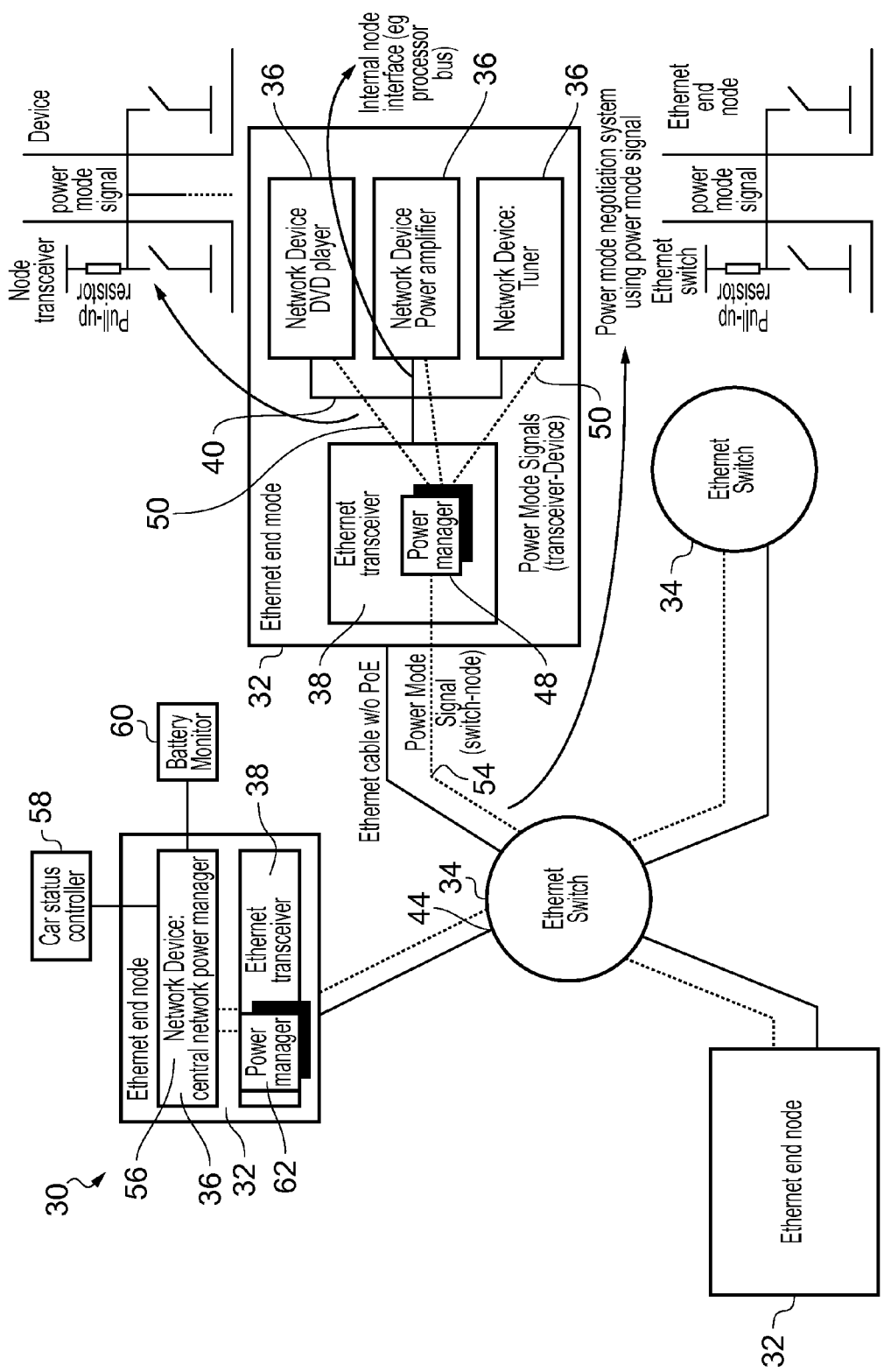
FIG. 3 is a schematic representation of a part of the communications network illustrated in FIG. 2.
Figure 4:
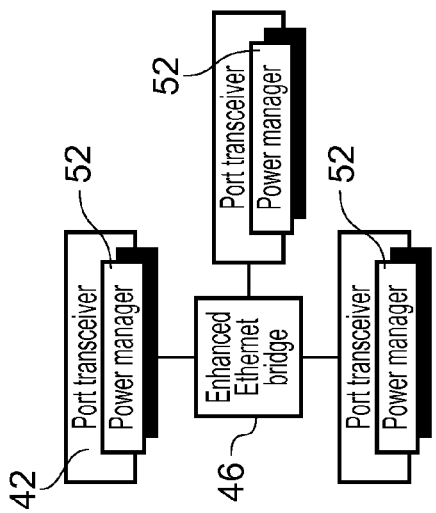
FIG. 4 is a schematic representation of a switch forming part of the communications network illustrated in FIG. 2.

Referring to FIGS. 2, 3 and 4, a communications network according to an embodiment of the invention is designated generally by the reference numeral 30. The network 30 comprises end nodes 32, and network switches 34. In this example each network switch 34 comprises four ports. It is to be understood that a communications network according to the invention could have any number of end nodes and any number of network switches having any number of ports. As shown in FIG. 3, each end node 32 comprises one or more network devices 36 operably connected to a network interface 38 comprising an Ethernet transceiver by means of an internal node interface 40 such as a processor bus.

Each switch 34 comprises a port transceiver 42 associated with each port 44 of the switch, together with the hardware associated with the switch. The port transceivers 42 forming part of a particular Ethernet switch may be connected to one another by means of an enhanced Ethernet bridge 46 as shown in FIG. 4.

The communications network 30 further comprises a first local power manager 48 associated with each end node 32 of the network. Each first local power manager 48 is positioned, in this embodiment, in a respective end node 32 for example in the transceiver 38 of that node.

The first local power manager 48 associated with a particular end node is adapted to transmit a first power mode signal 50 either from the network interface 38 to a network device 36, or vice versa. Depending on the properties of the first power mode signal 50, a device 36 may be powered down or powered up for example. Because the first power mode signal 50 may be transmitted either from the device 36, or to the device 36, the powering down or up can be instigated by either the device 36 itself, or by the network interface 38.

The network 30 further comprises a second power manager 52 associated with each switch port 44. The second local power manager 52 is adapted to transmit a second power mode signal 54 from a switch port 44 to an end node 32 in order to instigate possible powering down of the particular end node 32. Depending on the status of a particular end node 32, the end node may agree to the request to power down from a switch 34. The first 50 and second 54 power mode signals thus work together to effect powering down of particular network devices in response, for example to network traffic to and from that particular network device.

By means of the present invention therefore it is possible to individually control power to network devices 36.

Hitherto is has not been possible to efficiently control power to individual network devices forming a communications network. In addition, it has often been possible only to switch a device on or off, and not to power down a device leaving parts of the device on. When a network device is installed in a vehicle, it can be very important that some devices such a car radio maintain certain level of activity at all times even when the radio is off, for example to receive traffic reports which can then be available as soon as the car is switched on.

In the network 30 illustrated in FIGS. 2 and 3, the amplitude of both the first and second power mode signals may be determined by, for example, the status of an individual network device 40.

For example, each first 48 or second 52 local power manager may be adapted to sense the level of traffic to and/or from a particular device 36, and on the basis of the level of traffic sensed, generate a power mode signal of appropriate amplitude to, for example, power down the device 36.

The network 30 further comprises a central power management system 56. forming part of an end node 32 which is also operably connected to a car status controller 58 and the car battery monitor 60.

The central power management system 56 is adapted to instigate possible powering down and powering up of individual network devices 36 in response to external factors such as to the switching off of the engine of the car in which the communications network is installed. The central power management system 56 may therefore be connected to a plurality of sensors which will inform the central power management system 56 of the status of the car. Associated with the central power management system 56 is a third local power manager 62 which is adapted to transmit a third power mode signal to one or more of the end nodes 32 in response to the status of the car.

Figure 5:
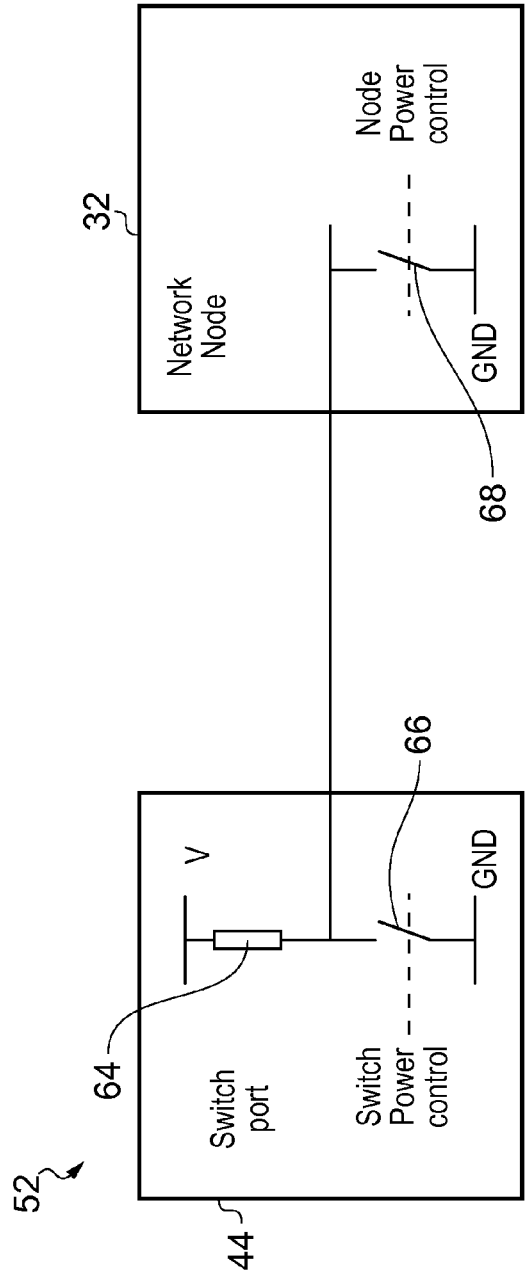
FIG. 5 is a schematic representation of a node forming part of the communications network illustrated in FIGS. 2 and 3.

Turning now to FIG. 5, the configuration of part of a second local power manager 52 is shown in detail. The second power manager 52 illustrated in FIG. 5 comprises a pull up resistor 64 positioned in a switch port 44, a first power switch 66 also located at the switch port 44, and a second power switch 68 located in a network end node 32. The power switches 66, 68 form a logical NOR with the resistor 64.

With this configuration, if a switch port 44 wishes to request that its peer unit (the end node 32 with which the switch port 44 is communicating) should be powered up, the switch port 44 simply grounds the second power mode signal by closing power switch 66. Alternatively, the end node 32 may signal that it may be powered down by opening power switch 68.

Once the second power mode signal has been grounded one of the peer units begins a wake-up procedure. Similarly, once the second power mode signal rises, both peer units know that they can enter a power down. This means that, in this arrangement the power down mode may only be entered when both of the peer units flag that they agree that this may happen. This agreement is signalled when the second power mode signal is high.

The configuration of the first power manager 48 and the third power manager 62 will be similar in that the pull up resistor 64 and power switch 66 may be positioned in the network interface of an end node, with the second power switch 68 located in the network device of that end node.

The operation of the network 30 will now be explained in more detail.

The status of a power switch 66, 68 is represented by the letter S. When a power switch is closed S=1. When a power switch is open S=0. The signal controlling the status of switch 66 will be designated S66, and the signal controlling the status of switch 68 will be designated S68.

Using this nomenclature, the power mode signal can be expressed as NOR(S62, S64).

This signal=1 only if S62=0 and S64=0.

If the devices are alive, the power mode signal will be represented by the value 0. If the devices are down the signal will=1.

The description hereinabove describes only one way for peer units to communicate and to agree to power down. It is to be understood however that peer units could communicate in different ways. For example, the pull up resistor could be replaced by a pull down resistor, with the power switches connected to the supply rail instead of the ground signal. In this configuration, a device requesting that its peer unit must be powered on, simply connects the power mode signal to voltage +V (power switch closed).

Alternatively, a particular communication channel with different protocols could be used.

When data is to be transmitted via the communications network 30, typically, a switch 34 in the forwarding process, detects on which port 44 a packet should be sent to, and if needed, holds the particular packet in a buffer. The second local power manager 50 associated with that switch then triggers a wake-up procedure by grounding the power mode line before forwarding the packet or packets. This has the effect of ensuring that the end node 32 to which the packet should be sent is active before the packet is sent.

On the other hand, an end node 32 will enter a power down mode only when the second power mode signal is high.

Such a system means that the powering up and down of a particular network device is dynamic.

Dynamic power management means that a device 36 is connected to the network 30 but the network interface 38 is shut down at some points in time according a regular pattern (eg periodic shut down) or according traffic profile. The micro power management will take into account the interface latency and throughput requirements from the device.

Alternatively static power management may be used. In this case, the device functionality is not required and the device can be disconnected from the network. The power down is decided by the central power management unit 56, or by the device 36 itself.

Typically a central power down (as a consequence of car locking for example) can be operated as follows: the central power management system 56 to which is connected the locking system of the car transmits a power down message in the form of a third power mode signal via the network 30 to all devices 34, 36 of the network. As a consequence all devices will enter a power down procedure and all the processes running on the devices will stop. After having closed these processes the devices 36 at each node will trigger a power down on the associated transceiver (interface) 38 by transmitting a first power mode signal to a peer interface 38 and by opening the power switch that grounds the power mode line connected to the network interfaces. The transceiver 38 will communicate to the switch to which it is connected that the Ethernet link can be stopped by transmitting a second power mode signal to the appropriate switch port and by opening the power switch that grounds the power mode line connected to the switch. The Ethernet transceiver will only power down once the power down signal is up this will only happen when the switch also agrees to power down the Ethernet link.

On the switch side, two scenarios are envisaged: either the switch is considered as an Ethernet device and will be powered down by the central power manager 56 as another network device.

Alternatively, the switch is not directly controllable by the central power manager system controller. In that case dynamic power management could be applied as described above and the switch will initiate power down mode on a port of a switch after a period of time characterized by the absence of traffic is elapsed. This is performed by opening the switch grounding the power down line connected to the device. The Ethernet transceiver on the corresponding port of the Ethernet switch will enter power down once the power down signal is up.

Another example is the power management of a hard disk drive that can potentially be used by two different devices in the system (like a GPS system or multimedia player). The HDD unit will only be shut down if the complete system is shut down (as explained above) or if it is not used by any units in the system. In this latter case the process running on the HDD unit signals to the Ethernet transceiver 38 connecting the HDD to the network 30 it can enter power down. This is performed by opening the switch grounding the power down signal connected to the device. The Ethernet transceiver 38 of the HDD unit will be powered down when the switch grounding the power down signal on the Ethernet switch is opened. The HDD unit will be powered up by any device on the network when Ethernet packet is sent again to the HDD device. The power up procedure will be initiated by the switch connected to the HDD unit by grounding the power mode signal. The Ethernet switch may buffer packets while initiating a wake up on the device. Packets will be buffered in the Ethernet switch until the Ethernet device is powered up and the Ethernet link is up and running again.

The power on a network device can be shut down under the following conditions:

1. a defined/programmable time out has elapsed since the last packet exchange;
2. the network device shuts down;
3. the complete system shuts down (for example the car is locked).
4. the switch it is connected to shuts down.

The present invention as described hereinabove is applicable to many different types of networks, and to different types of Ethernet works having different Ethernet PHY speeds (10 BT, 100 BT, gigabit Ethernet).

As mentioned hereinabove, the central power management system 56 of the Ethernet network 30 can be used to manage the power transmitted to a network device 36. The particular way that the power is managed is application dependent. For example a Wake-up on LAN technique can subsequently be applied after interface wake-up. The WoL packet itself can trigger a wake-up of the network devices 4 by a switch 6, 8.

By means of the present invention it is still necessary to have an always on circuit at a network end node 32 to monitor the power mode signal state. However, this can be achieved at very low power consumption. When the power is managed using time-out as mentioned hereinabove, the power management can be optimised using a VLAN technique in order to avoid too frequent broadcast messages waking up regularly unintended stations.

Alternatively, the switches 34 may manage the address information on behalf of the network devices. At wake-up, the extended switch will then communicate network parameters to the device connected to the corresponding port.

Data packets may be further analysed by the switches 34 and be filtered/buffered in order to minimise the number of wake-up events of end stations.

In particular, ARP requests can either systematically trigger wake-ups on all devices 36, or ARP requests may be treated by the switch 34 itself on behalf of a device 36. In such a situation and when the network is an Ethernet network the switch 34 will then cover some of the Ethernet layer 3 functionality to maintain the ARP tables.

The switches 34 forming part of a network according to the present invention may be enhanced to cope with the dynamic switching of the network devices as shown in FIG. 4. In particular, the switches may be adapted to buffer packets before forwarding to a particular device in order to allow for station wake-up transients or to minimise wake-ups.

The switches may also be adapted to carry out maintenance of network parameters including IP address, gateway, DNS servers etc, packet filtering etc.

In addition, the switches may be adapted to handle protocol exchange on behalf of a device.

Further, the switches may be adapted to process and replicate (in cascade) a system shutdown.

The switch at the root of the network may be connected to the central power management system 56 of the environment to apply and replicate a network shutdown.

The invention claimed is:

1. A communications network comprising a plurality of nodes, each including a network device and a network interface, at least one of the nodes having a first local power manager associated therewith and configured to control power to the network device, wherein the first local power manager is configured to transmit a first power mode signal from the network interface to the network device or from the network device to the network interface in dependence on a state of the network device, wherein the first local power manager comprises a pull up resistor, a first power switch configured to ground the first power mode signal at the request of one of the network interface and the network device, and a second power switch for grounding the first power mode signal at a request of the other of the network interface and the network device.

2. A communications network according to claim 1, wherein the first local power manager is configured to transmit the first power mode signal from the network interface to the network device, and wherein the first local power manager is located within the network interface.

3. A communications network according to claim 1 further comprising a central power management system configured to transmit a second power mode signal to at least one of the nodes in the communications network.

4. The communications network of claim 1, wherein the first local power manager is configured to sense a level of traffic to or from the network device and to control power to the network device in response to the level of traffic.

5. A communications network according to claim 1 wherein at least one of the nodes comprises a network switch and a second local power manager associated therewith configured to control power to and from the network switch.

6. A communications network according to claim 5 wherein the second local power manager is configured to transmit a second power mode signal from the network switch with which it is associated to an end node, or vice versa.

7. A communications network according to claim 6 wherein the second local power manager comprises a pull up resistor, a first power switch configured to ground the second power mode signal at a request of one of the switch and the end node to which the switch is connected, and a second power switch configured to ground the second power mode signal at a request of the other of the switch and the end node.

8. A communications network according to claim 6 wherein the second local power manager comprises a pull down resistor, a first power switch configured to connect the second power mode signal to a positive voltage at a request of one of the network switch and the end node to which the network switch is connected and a second power switch configured to connect the second power mode signal to the positive voltage at a request of the other of the network switch and the end node.

9. A communications network according to claim 5 wherein the second local power manager is configured to control power to the at least one network device in response to a state of a network device.

10. A method of controlling power to a network device forming part of a node of a communications network, the node including a network interface, the method comprising the step of:

transmitting a first power mode signal from the network interface to the network device or from the network device to the network interface in dependence on a state of the network device using a local power manager, wherein the local power manager comprises a pull up resistor, a first power switch for grounding the first power mode signal at the request of one of the network interface and the network device, and a second power switch for grounding the first power mode signal at a request of the other of the network interface and the network device.

11. A method according to claim 10 wherein at least one node of the communications network includes a network switch, the method comprising the further step of transmitting a second power mode signal from the network switch to an end node or vice versa, which second power mode signal is adapted to control power to the network.

12. A method according to claim 10 comprising the further step of transmitting a second power mode signal to at least one of the nodes, which second power mode signal is adapted to control power to the network.

13. The method of claim 10, wherein the method comprises sensing a level of traffic to or from the network device and controlling power to the network device in response to the level of traffic.

14. A communications network comprising a plurality of nodes, each including a network device and a network interface, at least one of the nodes having a first local power manager associated therewith and configured to control power to the network device, wherein the first local power manager is configured to transmit a first power mode signal from the network interface to the network device or from the network device to the network interface in dependence on a state of the network device, wherein the first local manager comprises a pull down resistor, a first power switch configured to connect the first power mode signal to a positive voltage at a request of one of the network interface and the network device, and a second power switch for connecting the first power mode signal to the positive voltage at a request of the other of the network interface and the network device.

15. The communications network of claim 14, wherein the first local power manager is configured to transmit the first power mode signal from the network interface to the network device, and wherein the first local power manager is located within the network interface.

16. The communications network of claim 14, wherein at least one of the nodes comprises a network switch and a second local power manager associated therewith configured to control power to and from the network switch.

17. The communications network of claim 16, wherein the second local power manager is configured to transmit a second power mode signal from the network switch with which it is associated to an end node, or vice versa.

* * * * *